United States Patent [19]

Tominaga et al.

[11] Patent Number: 4,482,808
[45] Date of Patent: Nov. 13, 1984

[54] APPARATUS FOR MEASURING NEUTRONS AND GAMMA RAYS

[75] Inventors: Hiroshi Tominaga; Yoshihiro Sase; Shoichi Horiuchi, all of Katsuta, Japan

[73] Assignees: Hitachi, Ltd.; Japan Atomic Energy Research Institute, both of Tokyo, Japan

[21] Appl. No.: 342,724

[22] Filed: Jan. 25, 1982

[30] Foreign Application Priority Data

Jan. 28, 1981 [JP] Japan .................................. 56-10212

[51] Int. Cl.³ ............................................. G01T 3/06
[52] U.S. Cl. ................................................. 250/392
[58] Field of Search .................. 250/390, 361 R, 392, 250/369

[56] References Cited

U.S. PATENT DOCUMENTS 3,270,205  8/1966  Ladd et al. ........................... 328/117
3,800,143  3/1974  Fishman et al. .................... 250/363
3,988,586  10/1976 Stuart et al. ........................ 250/367
4,002,909  1/1977  Packard et al. ..................... 250/328

FOREIGN PATENT DOCUMENTS 1387007  6/1972  United Kingdom .

OTHER PUBLICATIONS

B. Machai, "Automatic Gain Control Circuit for Scintillation Probe with Plastic Scintillator", *Nuclear Instruments and Methods*, vol. 118, No. 1, (1974), pp. 231–235.
P. Sperr, H. Spieler, M. R. Maier and D. Evers, "A Simple Pulse–Shape Discrimination Circuit", *Nuclear Instruments and Methods*, No. 116, (1974), pp. 55–59.
S. Kinbara and T. Kumahara, "A General Purpose Pulse Shape Discriminating Circuit", *Nuclear Instruments and Methods*, No. 70, (1969), pp. 173–182.

*Primary Examiner*—Janice A. Howell
*Assistant Examiner*—Constantine Hannaher
*Attorney, Agent, or Firm*—Antonelli, Terry & Wands

[57] ABSTRACT

An apparatus for measuring neutrons and gamma rays is disclosed in which after pulses generated by neutrons are discriminated from pulses generated by gamma rays, two different counted values are obtained for either the pulses generated by neutrons or the pulses generated by gamma rays to control a discriminating circuit between the pulses by neutrons and the pulses by gamma rays so that a ratio between the different counted values is kept constant, and further two different counted values are obtained for either the pulses by neutrons or the pulses by gamma rays in a manner the same as the above-mentioned to control the output of a detector so that a ratio between the counted values is kept constant.

6 Claims, 7 Drawing Figures

APPARATUS FOR MEASURING NEUTRONS AND GAMMA RAYS

The present invention relates to an apparatus for measuring neutrons and gamma rays in which neutrons and gamma rays emitted from a radioactive isotope are detected by a single detector, output pulses from the detector are separated into two parts, one of which is generated by the neutrons and the other is generated by the gamma rays, and each of these parts is counted, and more particularly to an apparatus for measuring neutrons and gamma rays in which a linear gain of a detecting, amplifying system and a discrimination characteristic for discriminating between neutrons and gamma rays are controlled and stabilized automatically.

For example, a British Pat. No. 1,387,007 discloses a method and an apparatus for determining the moisture content of a sintered material in which neutrons and gamma rays are detected by a single detector, and then the neutrons are discriminated from the gamma rays.

However, it has become clear that, according to the method and apparatus disclosed in the British Pat. No. 1,387,007, a discrimination characteristic for discriminating between neutrons and gamma rays is affected by a change in ambient temperature, and further the detected value of neutrons and the detected value of gamma rays are both affected by a change in temperature and system characteristics.

Accordingly, an object of the present invention is to provide a measuring apparatus for both neutrons and gamma rays capable of correcting a harmful influence which a change in ambient temperature and a change in system characteristics exert upon the performance of the apparatus.

A main feature of the present invention resides in that two kinds of control operations are performed in a measuring apparatus according to the present invention. That is, first, in order to compensate for a change in characteristics of a discrimination circuit for discriminating between pulses generated by neutrons and pulses generated by gamma rays, two channels for counting output pulses of the discrimination circuit are set, one of which is to count the whole of either the pulses generated by neutrons or the pulses generated by gamma rays, the other of which is to count a portion of the same pulses as above, a ratio of the number of counts between the two channels is taken, and the discrimination circuit is controlled so that the ratio is kept constant, since the ratio varies with the characteristics of the discrimination circuit. Second, in order to compensate for a change in linear gain mainly due to a temperature change, two different pulse-height levels are set for linear pulses from a detector for detecting neutrons and gamma rays, a ratio of the number of pulses exceeding the one pulse-height level to the number of pulses exceeding the other pulse-height level is taken for either the pulses generated by neutrons or the pulses generated by gamma rays, and a voltage applied to the detector or the amplification factor of a linear amplifier is controlled so that the ratio is kept constant, that is, an input of the discrimination circuit for discriminating between pulses generated by neutrons and pulses generated by gamma rays is controlled in the above-mentioned manner, since the ratio varies with the linear gain of the detector or linear amplifier.

The present invention will be apparent from the following detailed description taken in conjunction with the accompanying drawings, in which.

Figure 1:
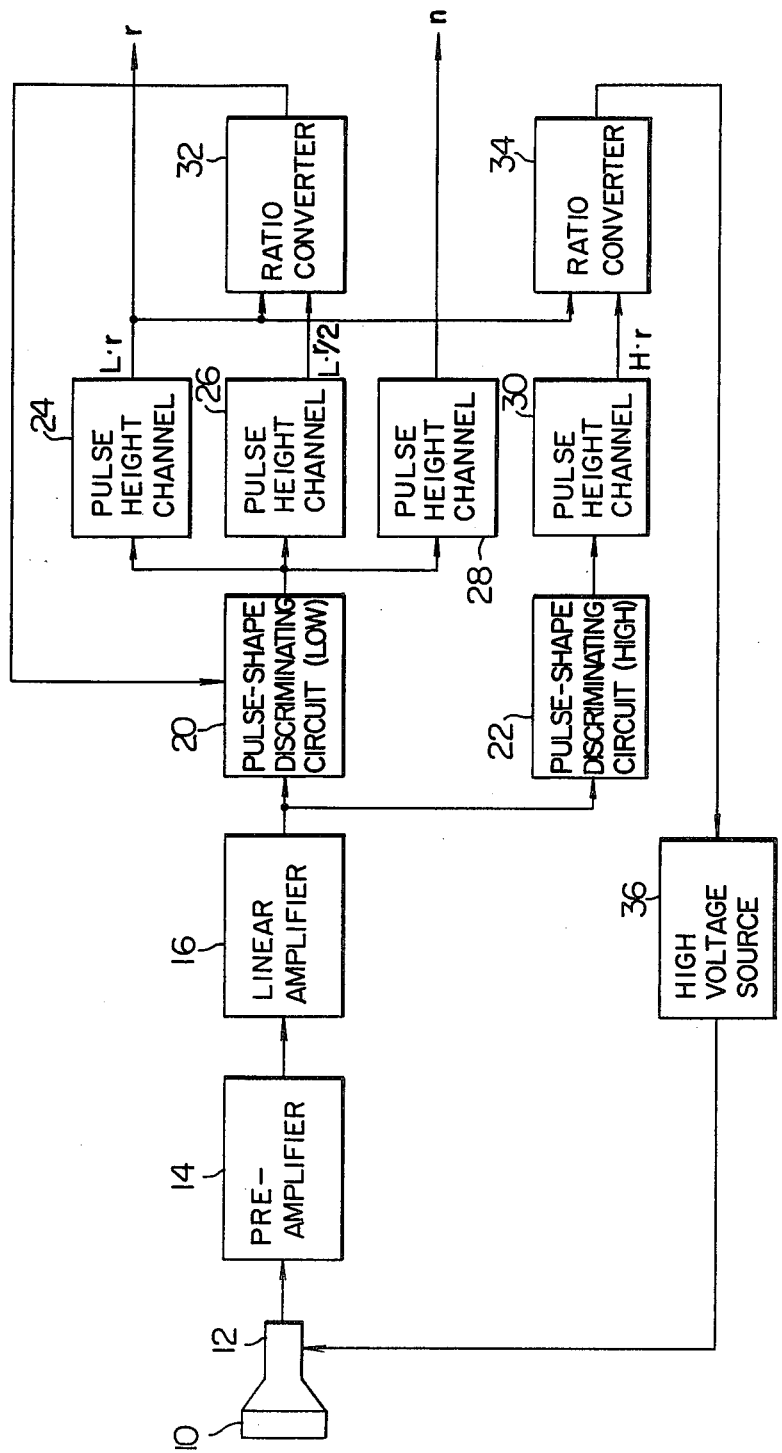
FIG. 1 is a block diagram showing an embodiment of an apparatus for measuring neutrons and gamma rays according to the present invention.
Figure 2:
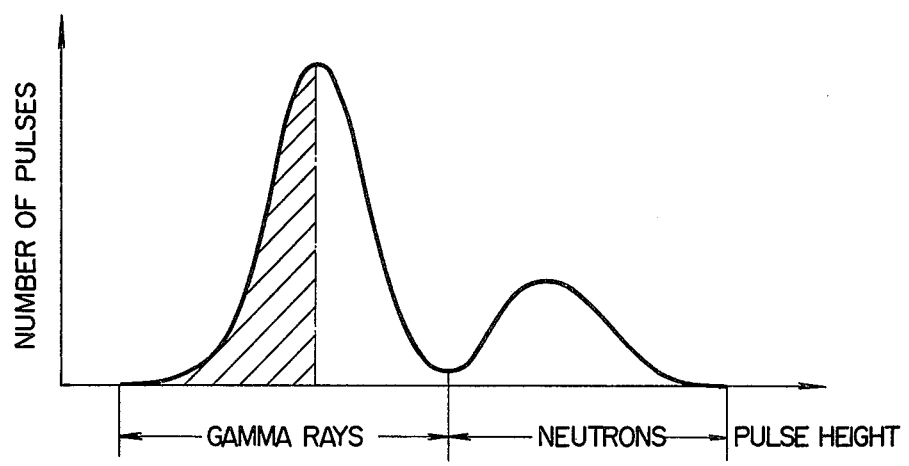
FIG. 2 is a graph showing a pulse height distribution of pulses generated by neutrons and gamma rays.

Referring to FIG. 1, pulses generated in an organic scintillator 10 by neutrons and gamma rays are applied to a pulse-shape discriminating circuit 20 through a photomultiplier 12, a pre-amplifier 14 and a linear amplifier 16. The pulse-shape discriminating circuit 20 includes therein a pulse-height discriminator for input pulses, and the pulse-height discriminator is adjusted so as to act as a low-level discriminator for rejecting pulses whose pulse heights are smaller than that level. The circuit 20 including a time-to-pulse height converter for converting the decay time of scintillation into a pulse height produces outputs whose pulse heights are distributed as shown in FIG. 2. The outputs pulses of the circuit 20 are applied to pulse height channels 24, 26 and 28, which are arranged to take up, respectively, the following pulse-height ranges in the pulse-height distribution shown in FIG. 2. That is, the pulse height channel 24 is so set as to count all the gamma-ray pulses, the pulse height channel 26 is so set as to count the gamma-ray pulses whose pulse height values are smaller than a pulse height corresponding to a maximum frequency in the pulse height distribution of gamma rays, and the pulse height channel 28 is so set as to count all the neutron pulses. A pulse-shape discriminating circuit 22 provided in parallel with the pulse-shaped discriminating circuit 20 includes therein a pulse-height discriminator, which is adjusted so as to act as a high-level discriminator. The waveform discriminating circuits 20 and 22 may be implemented by known pulse-shape discriminating circuits. Examples pf pulse-shape discrimination circuits are disclosed in an article entitled "A Simple Pulse-Shape Discrimination Circuit" which appears at pages 55–59 of Nuclear Instruments and Methods 116, 1974 and in an article entitled "A General Purpose Pulse Shape Discriminating Circuit" which appeara at pages 173–182 of Nuclear Instruments and Methods 70 (1969). The position and width of a pulse height channel 30 for receiving the output pulses of the pulse-shape discriminating circuit 22 are set so as to count all the gamma-ray pulses exceeding the high level of discrimination. Of these pulse height channels 24, 26, 28 and 30, the channels 24 and 28 can provide the number of pulses generated by gamma rays and the number of pulses generated by neutrons, respectively.

Next, a ratio of the number of pulses obtained from the pulse height channel 24, namely, the number of all the pulses of gamma rays fed through the low-level discriminator, to the number of pulses obtained from the pulse height channel 30, namely, the number of all the pulses of gamma rays fed through the high-level discriminator, is converted into a d.c. voltage by a ratio converter 34. The d.c. voltage thus obtained is used to control a high voltage output from a high voltage source 36. In more detail, the ratio converter 34 is connected to the high voltage source 36 in such a manner that the high voltage output from the high voltage source 36 is decreased when the ratio of the number of pulses fed through the high-level discriminator to the number of pulses fed through the low-level discriminator is greater than a preset value, and vice versa. The ratio converters 32 and 34 may be implemented by the pulse rate detector and converter which is disclosed in U.S. Pat. No. 3,800,143. Next, a ratio of the number of pulses obtained from the pulse height channel 24, namely, the number of all the gamma-ray pulses, to the number of pulses obtained from the pulse height channel 26, namely, the number of the gamma-ray pulses corresponding to a lower half of the pulse height distribution of these pulses gamma rays, both fed through the same low level discriminator, is converted into a d.c. voltage by a ratio converter 32. The d.c. voltage is used to control the conversion gain of the time-to-pulse height converter included in the pulse-shape discriminating circuit 20. That is, the ratio converter 32 is connected to the pulse-shape discriminating circuit 20 in such a manner that the conversion gain of the circuit 20 is increased when the ratio of the number of pulses corresponding to the lower half of the pulse height distribution to the number of all pulses generated by gamma rays, both fed through the same low-level discriminator is greater than a preset value, and vice versa.

In the present embodiment, let us consider the case where the gain of the photomultiplier 12 is increased by a temperature change or the like. Although both the number of pulses having passed through the low-level discriminator and the number of pulses having passed through the high-level discriminator are increased, an increasing rate of the number of pulses having passed through the high-level discriminator is greater than an increasing rate of the number of pulses having passed through the low-level discriminator, since an increase in pulse height of each pulse caused by an increase in the linear gain of the photomultiplier is proportional to the pulse height. Accordingly, a ratio of the number of pulses having passed through the high-level discriminator to the number of pulses having passed through the low-level discriminator is increased as the linear gain of the photomultiplier becomes higher. At this time, the output voltage of the ratio converter 34 is increased, and the high voltage output from the high voltage source 36 is thereby decreased. In the case where the linear gain of the photomultiplier is decreased, a reverse operation is performed. Thus, the gain of the photomultiplier is so controlled as to be kept constant. In the above-mentioned explanation, a ratio of the number of pulses which have passed through the high-level discriminator and are generated by gamma rays, to the number of pulses which have passed through the low-level discriminator and are generated by gamma rays, is used. This is based upon the following fact. The number of pulses generated by gamma rays and the number of pulses generated by neutrons are both varied each time the measurement of neutrons and gamma rays is made, and therefore a summed pulse height distribution of pulses generated by both gamma rays and neutrons is varied each time the measurement is made. On the contrary, a pulse height distribution of pulses generated by gamma rays or a pulse height distribution of pulses generated by neutrons can be considered to be kept substantially constant in a limited measuring range. Further, let us consider the case where a pulse height distribution of pulses output from the pulse-shape discriminating circuit 20 is moved toward a large pulse height region due to a temperature change or the like. The number of pulses output from the pulse height channel 26 for counting pulses corresponding to a lower half of a pulse height distribution (shown in FIG. 2) of pulses generated by gamma rays is decreased in a great degree, since pulses corresponding to a peak region of the above-mentioned pulse height distribution are lost. On the other hand, the number of pulses output from the pulse height channel 24 for counting all pulses generated by gamma rays is varied little, since the pulses generated by gamma rays are discriminated from the pulses generated by neutrons at a trough of a pulse height distribution of pulses generated by both gamma rays and neutrons. Accordingly, a ratio of the number of pulses obtained from the pulse height channel 26 to the number of pulses obtained from the pulse height channel 24 is decreased, and the output voltage of the ratio converter 32 becomes low. Thus, a conversion gain at time-to-pulse height conversion performed in the pulse-shape discriminating circuit 20 is decreased so that the pulse height distribution is returned to an initial place. A similar compensation is inversely made in the case where the pulse height distribution of pulses output from the circuit 20 is moved toward a small pulse height region. Thus, the discrimination characteristic of the pulse-shape discriminating circuit 20 is controlled so that a peak position and a trough position at a pulse height-distribution of pulses generated by gamma rays are both fixed.

Figure 3:
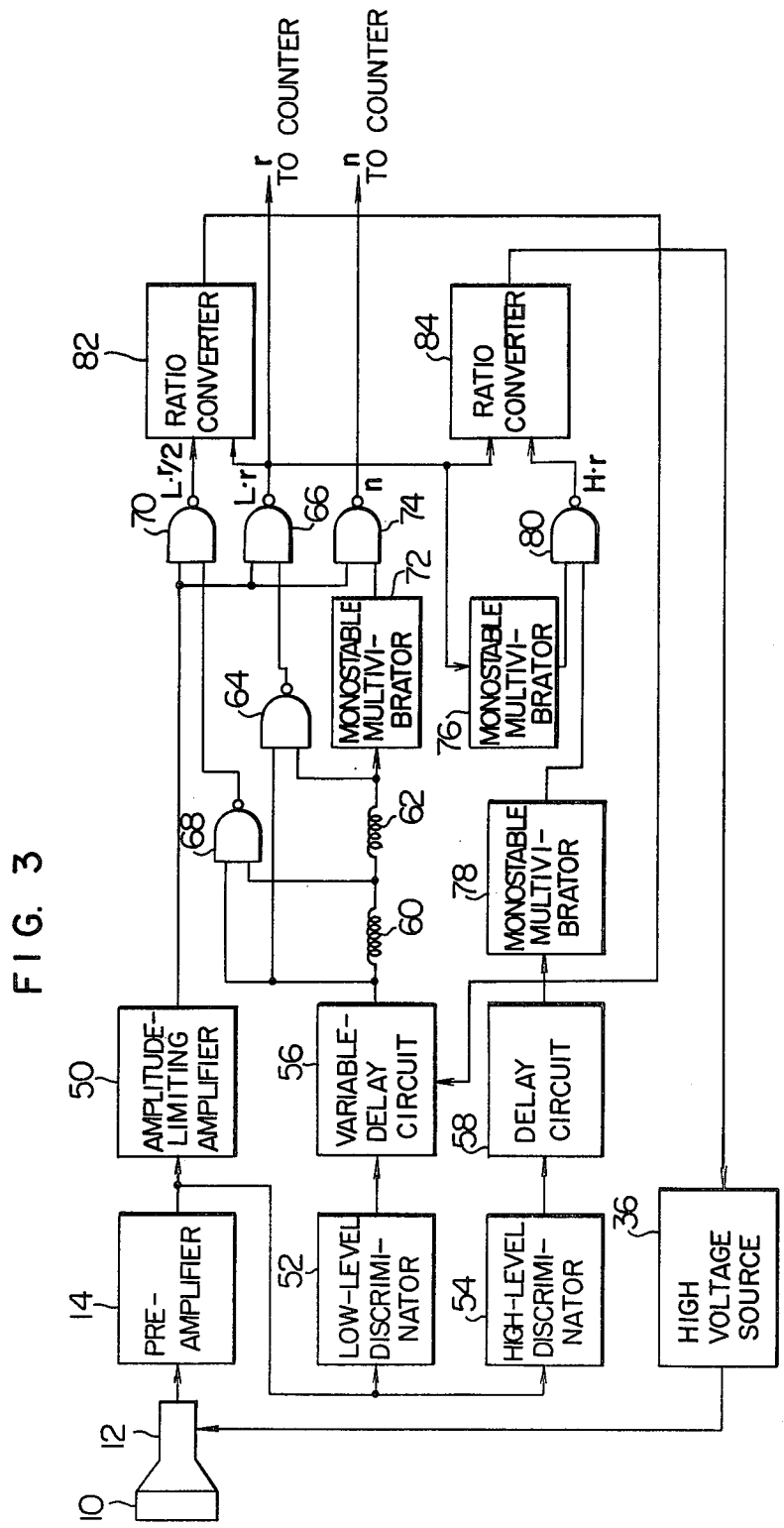
FIG. 3 is a block diagram showing another embodiment of an apparatus for measuring neutrons and gamma rays according to the present invention.
Figures 4A, 4B, 4C, 4D:
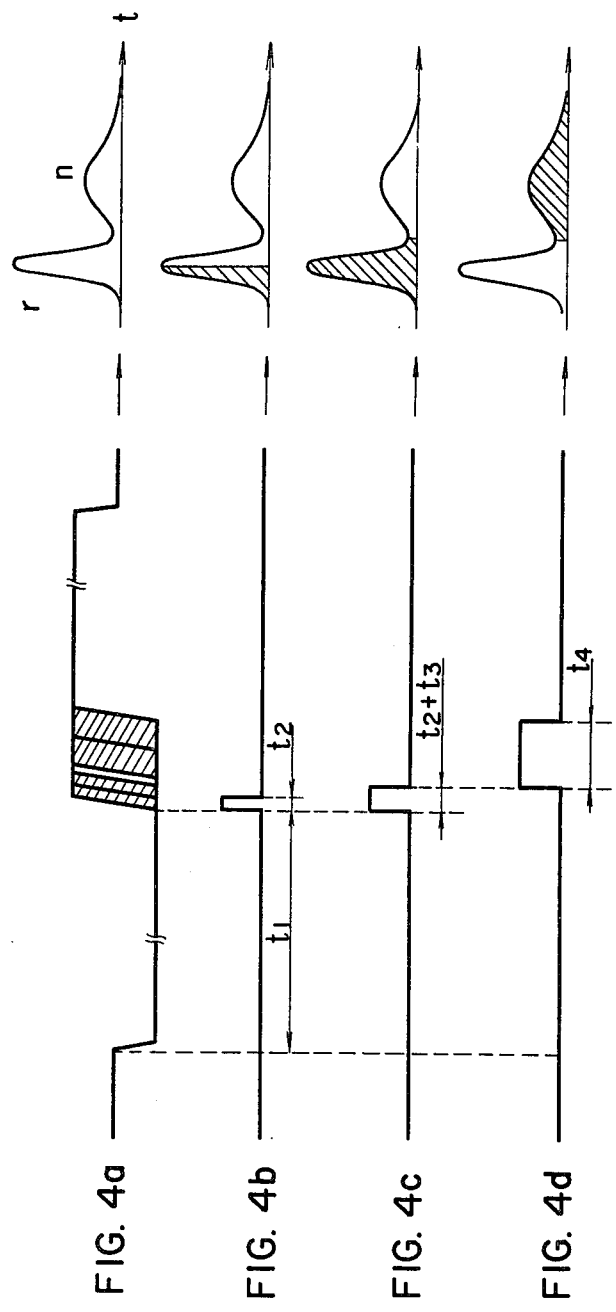
FIGS. 4a to 4d are views for explaining a discriminating operation for discriminating between pulses generated by neutrons and pulses generated by gamma rays in the embodiment shown in FIG. 3.

FIG. 3 is a block diagram showing another embodiment of the present invention. In the embodiment shown in FIG. 1, a decay time in scintillation is converted by each pulse-shape discriminating circuit into a pulse height, and the number of pulses generated by neutrons, the number of pulses generated by gamma rays and the number of part of pulses generated by gamma rays are output from respective pulse height channels. On the other hand, in the embodiment shown in FIG. 3, the decay time-to-pulse conversion is not performed, but time channels having different gate-open duration times are used for obtaining the counts of pulses of respective ranges, in view of the fact that the pulses of gamma rays and neutrons have different decay times. In more detail, light pulses generated by neutrons are long in decay time, and light pulses generated by gamma rays are short in decay time. Electric pulses corresponding to these light pulses are pulse-shaped and amplified by an amplitude-limiting amplifier 50. Thus, the electric pulses become, as shown in FIG. 4a, bipolar pulses having the form of square waves, and the bipolar pulses generated by gamma rays and the bipolar pulses generated by neutrons are made different in time at which each bipolar pulse crosses a zero level. The bipolar pulses thus formed are applied to time channels, each of which is so set to have a desired channel width and a desired channel position, and thus the number of pulses generated by neutrons, the number of all pulses generated by gamma rays and the number of that part of pulses generated by gamma rays which correspond to a lower half of a pulse width distribution of these pulses, are obtained. A low-level discriminator 52 detects the output pulse of a preamplifier 14 to deliver a timing pulse. The timing pulse is delayed by a variable delay circuit 56 by a time $t_1$, and the timing pulse thus delayed is delayed by a delay line 60 by a time $t_2$ and further delayed by a delay line 62 by a time $t_3$. Such a time channel pulse for detecting all pulses generated by gamma rays as shown in FIG. 4C is formed by using the output of the variable delay circuit 56, the output of the delay line 62, and a gate circuit 64. A time channel 66 gives, as the number of all pulses generated by gamma rays, the number of pulses which are output from the amplitude-limiting amplifier 50 and cross the zero level in a pulse width $t_2+t_3$ of the time channel pulse. Similarly, a time channel pulse having a pulse width $t_2$ such as shown in FIG. 4b is formed by using the output of the variable delay circuit 56, the output of the delay line 60, and a gate circuit 68. The channel pulse $t_2$ corresponds to a lower half of a time width distribution of pulses generated by gamma rays. Accordingly, a time channel 70 gives the number of pulses corresponding to a lower half of a time width distribution of pulses generated by gamma rays. A monostable multivibrator 72 connected to the delay line 62 delivers such a time channel pulse having a pulse width $t_4$ as shown in FIG. 4d, and a time channel 74 gives the number of pulses generated by neutrons. The number of pulses which are generated by gamma rays and have passed through a high-level discriminator 54, is obtained from the output pulses of a gate circuit 80 which are produced upon coincidence between the pulses output from the high-level discriminator 54 and the pulses supplied from the time channel 66, since not only pulses generated by gamma rays but also pulses generated by neutrons can pass through the high-level discriminator 54. The pulses output from the high-level discriminator 54 are delayed by a delay circuit 58 by a time $t_1$ in order to be synchronized with the pulses supplied from the time channel 66. Further, monostable multivibrators 76 and 78 enlarge the pulse width of each of pulses applied to these multivibrators 76 and 78 in order to obtain the above-mentioned coincidence. Respective outputs of the time channels 66 and 70 are applied to a ratio converter 82 in order to control the variable delay circuit 56, thereby controlling the discrimination characteristics. Further, respective outputs of the time channel 66 and gate circuit 80 are applied to a ratio converter 84, the output of which is used to control the gain of the photomultiplier 12.

As mentioned above, according to the present invention, not only a discrimination characteristic for discriminating between pulses generated by neutrons and pulses generated by neutrons but also a linear gain of a detecting, amplifying system is controlled, and therefore a measuring apparatus can be formed which is not readily affected by a change in ambient temperature and by a change in characteristics of the above-mentioned system with time.

We claim:

1. An apparatus for measuring neutrons and gamma rays comprising
   a detector for detecting both neutrons and gamma rays;
   a pulse-shape discrimination circuit for output pulses of said detector to discriminate between pulses generated by neutrons and pulses generated by gamma rays;
   counters for counting said pulses generated by neutrons and said pulses generated by gamma rays; and
   means for obtaining a ratio between two different counted values for either said pulses generated by neutrons or said pulses generated by gamma rays to control said discrimination circuit so that the ratio between said two counted values is kept constant.

2. An apparatus according to claim 1, wherein two different pulse-height levels are set for said output pulses of said detector, pulses exceeding one of said levels and pulses exceeding the other level are counted, and the output of said detector is controlled so that a ratio between two values obtained by said counting operation is kept constant.

3. An apparatus for measuring neutrons and gamma rays comprising:
   a detector for detecting both neutrons and gamma rays;
   an amplifier for amplifying output pulses of said detector;
   a pulse-shape discriminating circuit for discriminating between pulses generated by neutrons and pulses generated by gamma rays;
   counters for counting pulses output from said pulse-shape discriminating circuit and originated by neutrons as well as pulses output from said pulse-shape discriminating circuit and originated by gamma rays; and
   means for obtaining two counted values for respective pulses of the same kind of radiation but of different portions in the distribution of output pulses of said pulse-shape discriminating circuit to control said pulse-shape discriminating circuit so that a ratio between said counted values is kept constant.

4. An apparatus according to claim 3, further comprising another pulse-shape discriminating circuit having a pulse height discrimination level different from that level at said pulse-shape discriminating circuit, and means for obtaining two counted values for pulses of the same kind of radiation from respective outputs of said pulse-shape discriminating circuits to control the output of said detector so that a ratio between said two counted values is kept constant.

5. An apparatus for measuring neutrons and gamma rays comprising:
   a detector for detecting both neutrons and gamma rays;
   an amplitude-limiting amplifier for converting output pulses of said detector into square wave pulses;
   a discriminator for detecting the leading edge of each output pulse of said detector to deliver a timing pulse;
   delay means for generating three pulses from each output pulse of said discriminator, said three pulses being different in delay time from each other;
   means for obtaining a counted value indicating the number of pulses generated by neutrons and a counted value indicating the number of pulses generated by gamma rays on the basis of two pulses from said delay means and output pulses of said amplitude-limiting amplifier; and
   means for obtaining two different counted values of the same kind on the basis of two pulses from said delay means and said output pulses of said amplitude-limiting amplifier to control said output pulses of said delay means so that a ratio between said two different counted values is kept constant.

6. An apparatus according to claim 5 further comprising another discriminator having a level different from a level at said discriminator, and means for obtaining two counted values of the same kind on the basis of two pulses from said two discriminators and said output pulses of said amplitude limiting amplifier to control said detector means so that a ratio between said two counted values is kept constant.

* * * * *